United States Patent [19]
Frost

[11] 3,799,585
[45] Mar. 26, 1974

[54] ROTARY FLUID JOINT

[75] Inventor: Frank E. Frost, Charlotte, N.C.

[73] Assignee: Reed Tool Company, Houston, Tex.

[22] Filed: Nov. 17, 1972

[21] Appl. No.: 307,453

[52] U.S. Cl. ........................ 285/93, 277/59, 277/73, 285/98, 285/106, 285/111, 285/276

[51] Int. Cl. ........................ F16l 27/00

[58] Field of Search ........... 285/93, 94, 96, 98, 100, 285/102, 106, 281, 280, 278, 276, 275; 277/3, 59, 73

[56] References Cited

UNITED STATES PATENTS

| | | | |
|---|---|---|---|
| 3,694,008 | 9/1972 | Slator et al. | 285/94 |
| 3,514,113 | 5/1970 | Weiswurm | 277/3 |
| 3,062,554 | 11/1962 | McGaman et al. | 277/3 |
| 2,727,760 | 12/1955 | Fawick | 285/94 |
| 2,345,019 | 3/1944 | Van Alstyne | 285/275 |

*Primary Examiner*—Mervin Stein
*Assistant Examiner*—Alex Grosz
*Attorney, Agent, or Firm*—Parrott, Bell, Seltzer, Park & Gibson

[57] ABSTRACT

In a rotary fluid joint, an improved sealing means for effecting a leakproof seal between a housing and a conduit rotably mounted therein, and comprising at least one pressure responsive seal carried by the housing in surrounding sealing relation to the conduit, a supply of a substantially non-compressible fluid communicating with the seal for transmitting a sealing pressure thereto for maintaining the desired sealing relation between the seal and the conduit, and pressurizing means communicating with the supply of pressure transmitting fluid and a bore in the housing and, responsive to the pressure of the fluid flowing through the bore, for applying a proportionally corresponding pressure to the pressure responsive seal through the supply of the pressure transmitting fluid.

10 Claims, 4 Drawing Figures

ROTARY FLUID JOINT

This invention relates to a rotary fluid joint adapted particularly for introducing a pressurized fluid, such as paint, solvent, or the like, into a rotatable conduit while preventing leakage at the joint of the fluid being thus introduced. There have been numerous attempted solutions to the probelm of how best to convey fluids which are abrasive because of a high particulate content, or which are extremely reactive because of a high caustic content. The problem has been particularly severe in the paint industry, where it is necessary to convey through various types of conduits, paints containing pigment material which is very abrasive, and quickly destroys sealing materials with which the paint comes in contact. Essentially the same destructive result is obtained when cleaning the conduit by means of a caustic solution which is flushed through the various conduits to disperse and carry away paint residues.

The leakage problem has been especially severe where it is necessary to introduce a fluid from a stationary conduit into a rotating one, or vice versa. Heretofore, various packing materials have been used with varying degrees of success. Generally, experience has shown that fluids having a high percentage of abrasive particulate matter suspended therein, and transported under high pressure, destroy elastomeric-type seals as frequently as every one to two days. One reason is that even though fluids are transported at varying pressures, it has heretofore been necessary to constantly maintain the sealing pressure of the seal at the maximum level in order to prevent leakage at maximum pressures. This result in an inordinately high rate of wear, since the sealing pressure is often much greater than is required to precent leakage.

It is the object of this invention to provide a rotary fluid joint which provides a substantially leakproof seal and thus eliminates the problems set forth above.

More particularly, it is an object of this invention to provide a pressure responsive seal of the aforementioned type, which compensates for gradual wear and adjusts itself to the pressure of the fluid passing therethrough, in order to decrease the frequency of seal replacement.

It is another object of this invention to provide a rotary fluid joint which utilizes pressure of the fluid passing therethrough to maintain a continuously leakproof seal.

Some of the objects of the invention having been stated, other objects will become evident as the description proceeds, when taken in connection with the accompanying drawings, in which FIG. 1 is a perspective view of a rotary fluid joint according to the invention;

Figure 1:
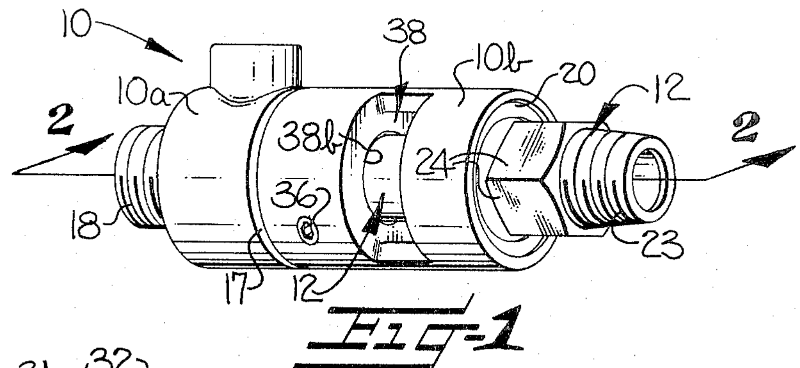
Figure 2:
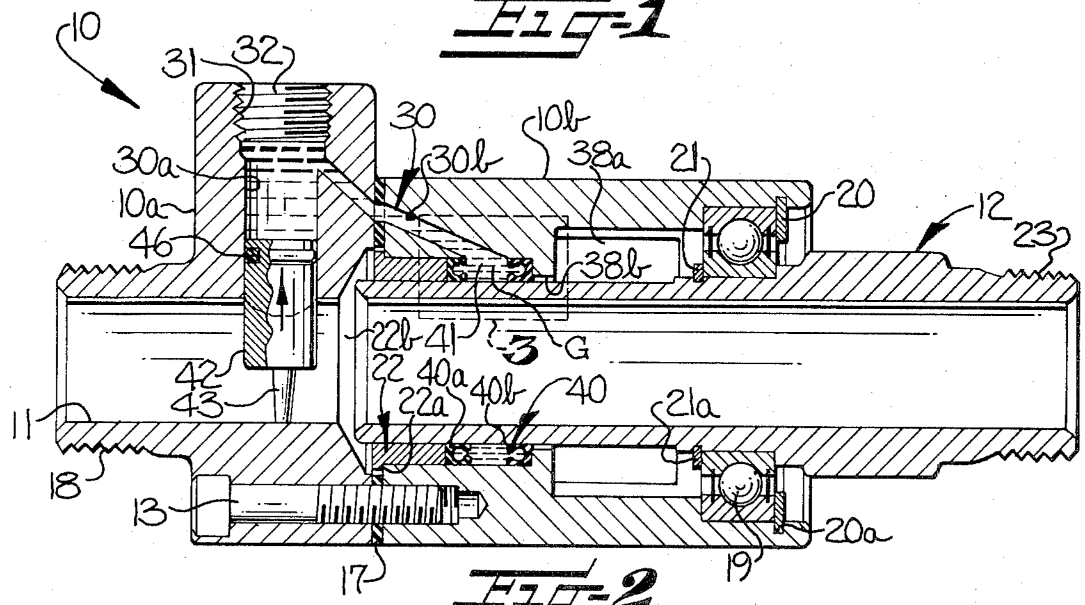
FIG. 2 is a vertical cross-section taken substantially along line 2—2 in FIG. 1.

Referring now more specifically to the drawings, a rotary fluid joint according to the invention is shown in FIG. 1 and comprises a substantially cylindrical housing, broadly indicated by reference numeral 10, and, as is best shown in FIG. 2, having a bore 11 therethrough for the flow of a pressurized fluid therein. Rotatably mounted in housing 10 in communication with bore 11 for permitting the flow of a pressurized fluid therethrough is a conduit, broadly indicated by reference numeral 12.

Housing 10 is comprised of a pair of substantially cylindrical housing members, 10*a* and 10*b* respectively, connected together at adjacent radial end surfaces by means of bolts 13 positioned in matingly threaded bores extending axially through the walls of housing members 10*a* and 10*b*. Positioned intermediate the adjoining radial surfaces of housing members 10*a* and 10*b* is a sealing ring 17, formed of a suitable elastomeric material, and intended to prevent leakage from bore 11 where housing members 10*a* and 10*b* are connected. Sealing ring 17 is provided with suitably spaced holes 17*a* to permit the passage of bolts 13 therethrough.

Housing member 10*a* has formed thereon remote from conduit 11 a coupler of reduced size 18, having threads formed along the outside axial surface thereof for connecting to a supply source having a matingly threaded coupler.

Conduit 12 is mounted for rotation in bore 11 by means of an annular ball bearing assembly 19, positioned in bore 11 in surrounding relation to conduit 12. Ball bearing assembly 19 is maintained in axial alignment with conduit 12 by tightening rings 20 and 21 respectively, positioned on either side of bearing assembly 19 and in suitably formed annular grooves 20*a*, 21*a*, on the surface of bore 11 and the outside surface of conduit 12 respectively.

Radial dislocation of conduit 12 during rotation is prevented by means of a collet, broadly indicated by reference numeral 22, which is positioned as by a press fit, on the end of conduit 12 for rotation therewith within housing member 10*b* and serves as a secondary bearing for conduit 12. Formed on the end portion of collet 22 adjacent the end of conduit 12 is a tapered axial face 22*a*, as shown in FIG. 2, which fits snugly against a matingly tapered wall portion 22b defining bore 11 in housing member 10*a*. Formed on the portion of conduit 12 which extends outwardly from within bore 11 of housing member 10*b* adjacent the end thereof is a coupler 23, with threads thereon to facilitate connection of the conduit to another rotating conduit having a matingly threaded coupler portion.

On the outer axial surface of conduit 12 intermediate housing member 10*b* and the threaded portion 23 is a plurality of flat sides 24 to facilitate manual rotation of conduit 12 by means of a wrench, etc.

Located within the walls of housing 10 and extending substantially axially therethrough is a passageway, broadly indicated by reference numeral 30, as is best shown in FIG. 2. Passageway 30 is comprised of a plurality of communicatively connected passageway portions, including a bore defining a passageway portion 30*a*, extending through the wall of housing 10*a*, communicating with both bore 11 and the outside surface of housing member 10*a* and substantially perpendicular to said bore 11.

Threads 31 are formed on the walls of passageway portion 30*a* adjacent the outer surface of housing member 10*a* for receiving an upper passageway plug 32 having threads around the circumference thereof for sealingly interrupting communication of passageway portions 30*a* with the outside surface of housing member 10*a*, the purpose of which will be set forth hereinafter. Communicatively connected to passageway portion 30*a* is a passageway portion 30*b*, which is relatively small in diameter than passageway portion 30*a*, and, as is best shown in FIG. 2, extends angularly from passageway portion 30*a* at a point just below the furtherest penetration of upper passageway plug 32, axially and radially into and through housing 10. A hole 17*b* in sealing ring 17 permits communication between the portions of passageway portion 30*b* in housing members 10*a* and 10*b*.

The inner wall of bore 11 in housing member 10*b* and the radial surface of collet 22 opposite tapered radial surface 22*a*, forms an annular recess 30*c*, which, as is shown in FIG. 2, surrounds conduit 12 and communicates directly with passageway portion 30*b*.

Figure 4:
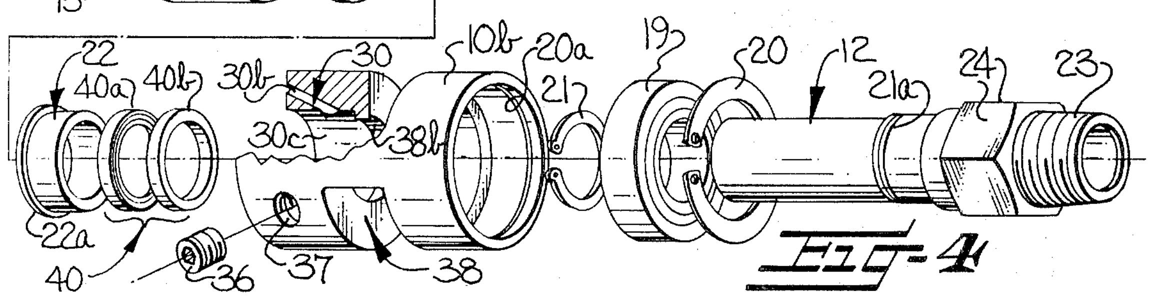
FIG. 4 is an exploded perspective view of the invention.

As is best shown in FIG. 4, a lower passageway plug 36 is positioned in a threaded bore 37 extending through the wall of housing member 10*b* and communicating with annular recess 30*c* and the outer surface of housing member 10*b*, the purpose for which will be set forth hereinafter.

Formed in the wall of housing member 10*b* intermediate annular recess 30*c* and ballbearing assembly 19 are drainage means, broadly indicated by reference numeral 38 and comprising a drainage "window" 38*a*, and an annular drainage recess 38*b*. As is best shown in FIG. 3, drainage recess 38*b* comprises a space between, and defined by the inner wall of housing member 10*b* and conduit 12 intermediate annular recess 30*c* and drainage "window" 38*a*, thus permitting communication between "window" 38*a* and annular recess 30*c*.

Positioned in opposing relation on opposite axial walls of annular recess 30*c* and serving to effectuate a substantially leakproof seal between housing 10 and conduit 12 are sealing means, broadly indicated by reference numeral 40. Sealing means 40 comprises a pair of pressure responsive seals 40*a* and 40*b* respectively, each comprising an annular, substantially C-shaped resilient member of some wear-resistant material, and forming therebetween a reservoir 41 for accommodating fluid pressure. Pressure responsive seals 40*a*, 40*b*, are supported by the walls of annular recess 30*c*, and in the instance of seal 40*a*, also by the adjacent radial surface of collet 22. It will be understood that seals 40*a*, 40*b*, when installed in annular recess 30*c* are in sealing engagement with conduit 12, so that the pressure in passageway 30 maintains the sealing relation during rotation of conduit 12 and as the seals 40*a*, 40*b* gradually wear away.

Figure 3:
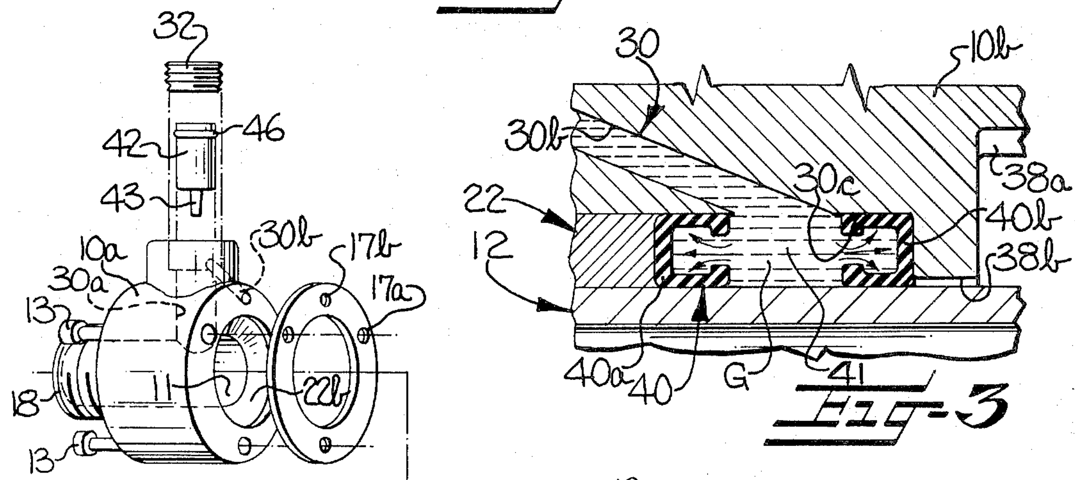
FIG. 3 is an enlarged, fragmentary vertical cross-sectional view of the pressure and responsive seal portion indicated at 3, in FIG. 2.

Serving to expand pressure responsive seals 40*a*, 40*b*, is a supply of a substantially non-compressible fluid, such as grease, indicated by reference letter G substantially filling passageway 30, as is indicated by horizontal, broken lines in passageway 30 in FIGS. 2 and 3. Pressure is exerted on the grease, and transmitted thereby to the pressure responsive seals 40*a*, 40*b* by pressurizing means communicating with the grease and with bore 11, which pressurizing means comprises a piston 42, slidably positioned in passageway portion 30*a* and protruding outwardly therefrom into bore 11 for being directly acted upon by the flow of pressurized fluid therein. As is best shown in FIGS. 2 and 4, piston 42 has connected to the axial face thereof which extends into bore 11 a prop 43, which prop 43 is intended to engage the wall of housing member 10*a* which forms bore 11, opposite piston 42 and thereby prevent said piston 42 from protruding so far into bore 11 that the flow of pressurized fluid therethrough is unduly restricted.

In order to provide a leakproof seal between the walls of passageway portion 30*a* and piston 42 slidably positioned therein so as to insure that the grease in passageway 30 and the pressurized fluid flowing through bore 11 do not comingle, an elastomeric O-ring seal 46, as is best shown in FIG. 2, is positioned in an annular recess around the circumference of piston 42.

To fill passageway 30 with grease in order to make the rotary fluid joint operable, both the upper and lower passageway plugs 32 and 36 are removed. Grease is then injected into passageway 30 through bore 37, filling the annular recess portion 30*c* of passageway 30 first, and then, progressively, the rest of passageway 30. With upper plug 32 removed, air in passageway 30 is easily expelled as the grease enters, thus preventing air bubbles, which, if trapped in the system would substantially lower the efficiency of the system by increasing the amount of compression of the fluid supply.

Additionally, an initial pressure can be established in passageway 30 by filling the passageway with grease to a point just slightly above the lowermost threads 31 in passageway portion 30*a*, so that when upper plug 32 is screwed in, it exerts a force on the grease. Thus, even if the pressure in bore 11 ceases, a continuing sealing pressure maintains a positive sealing relation between pressure responsive seal 40*a* and 40*b*, and the rotating conduit 12.

As is evident from the foregoing description, pressure is maintained on pressure responsive seals 40*a* and 40*b* proportionally corresponding to the pressure of the fluid which is being transported through bore 11 and conduit 12 by the action of the pressurized fluid on piston 42. It will be understood that in order for the pressure responsive seals 40*a*, 40*b* to function properly, conduit 12 need not be rotating. Likewise, it will be understood that fluid may flow through the rotary fluid joint in either direction without any substantial difference in the effectiveness of the pressure responsive seals 40*a*, 40*b*.

It is anticipated that some slight amount of grease in passageway 30 will leak from the rotary fluid joint, as well as some of the pressurized fluid flowing through the rotary fluid joint, as the pressure responsive seals 40*a*, 40*b* begin to wear away. In order to insure detection of this leakage, drainage means 38, with its drainage recess 38*b*, as described above, functions to channel the leakage out of the rotary fluid joint and into the "window," 38*a* where the leakage can be visually detected and trapped.

This is easily and simply accomplished, because the drainage recess 38*b* is at atmospheric pressure. Because the grease within passageway 30 and the pressurized fluid flowing through the rotary fluid joint are at substantially higher pressures, any leakage around the seals will tend to flow towards a lower pressure area, i.e., the drainage recess 38*b*. Window 38*a* also serves as a barrier to prevent leakage from flowing axially down conduit 12 and contaminating ballbearing assembly 19.

It will be understood that as leakage of grease may occur, piston 42 moves upward to accommodate the lost volume of grease. Thus, the effectiveness of the rotary fluid joint remains relatively constant even though the volume of grease in passageway 30 is very gradually diminished. It is expected that the grease would be replenished at appropriate intervals so that at least a portion of piston 42 remains in bore 11, however sealing pressure is adequately maintained even if piston 42 does not protrude into bore 11.

It will thus be seen that there is described herein a rotary fluid joint which utilizes the pressure of a fluid flowing therethrough to provide a sealing pressure.

It will be understood that various details of the invention may be changed without departing from the scope of the invention. Furthermore, the foregoing description is for purposes of illustration only and not for purposes of limitation — the invention being defined by the claims.

That which is claimed is:

1. In a rotary fluid joint, including a housing having a bore therethrough for the flow of a pressurized fluid therein, and a conduit rotatably mounted in said housing in communication with said bore for permitting the flow of the pressurized fluid therethrough, the combination therewith of sealing means for effecting a seal between said housing and conduit to substantially prevent leakage of pressurized fluid from therebetween, said sealing means comprising;

a. at least one pressure responsive seal carried by said housing in surrounding sealing relation to said conduit, b. a substantially non-compressible fluid communicating with said seal for transmitting a sealing pressure thereto for maintaining the desired sealing relation between said seal and said conduit, and c. pressurizing means communicating with said pressure transmitting fluid and said bore in said housing, and responsive to the pressure of the fluid flowing through said bore for applying a proportionally corresponding pressure to said pressure responsive seal through said pressure transmitting fluid, whereby the sealing relation between said seal and said conduit is maintained without regard to pressure fluctuations in said bore.

2. A rotary fluid joint according to claim 1, wherein said housing includes a passageway communicating with said seal and said pressure responsive means, and wherein said substantially non-compressible fluid substantially fills said passageway.

3. A rotary fluid joint according to claim 2, wherein said pressurizing means comprises a piston slidably positioned within said passageway.

4. A rotary fluid joint according to claim 3, wherein a portion of said piston protrudes from said passageway into said bore.

5. A rotary fluid joint according to claim 4, including means limiting the protrusion of said piston into said bore for limiting the restriction by said piston of the flow of said pressurized fluid therethrough.

6. A rotary fluid joint according to claim 2, wherein said passageway extending through said housing communicates with the outside surface of said housing for the introduction of said substantially non-compressible fluid into said passageway and including plugging means normally positioned in said passageway for sealingly interrupting communicating of said passageway with the outside surface of said housing.

7. A rotary fluid joint according to claim 6, wherein said plugging means, when normally positioned in said passageway, pressurizes said substantially non-compressible fluid for transmitting a minimum sealing pressure to said sealing means without regard to the pressure within said bore.

8. A rotary fluid joint according to claim 2, wherein a portion of said passageway comprises an annular recess in said housing surrounding said conduit, and wherein said pressure responsive seal is positioned in said annular recess to form a reservoir for expansibly accommodating said sealing pressure for maintaining the desired sealing relation with said conduit.

9. A rotary fluid joint according to claim 2, wherein a portion of said passageway comprises an annular recess in said housing surrounding said conduit, and wherein a pair of said pressure responsive seals, each comprising an annular, substantially C-shaped resilient member, is positioned in opposing relation on opposite axial walls of said annular recess to form a reservoir therebetween for expansionably accommodating said sealing pressure for maintaining the desired sealing relation with said conduit.

10. A rotary fluid joint according to claim 9, wherein said housing has drainage means communicating with said recess and the outer surface of said housing for reducing the pressure on one side of said annular recess in relation to the other side thereof, thereby inducing the flow of any leakage from said pressure responsive seals to the outer surface of said housing for facilitating visual detection of the leakage.

* * * * *

UNITED STATES PATENT OFFICE

CERTIFICATE OF CORRECTION

Patent No. 3,799,585 Dated March 26, 1974

Inventor(s) Frank E. Frost

It is certified that error appears in the above-identified patent and that said Letters Patent are hereby corrected as shown below:

Column 1, line 33,"result" should be --results--

Column 1, line 35, "precent" should be --prevent--

Column 3, line 2, "small" should be --smaller--

Column 6, line 14, "communicating" should be --communication--

Signed and sealed this 24th day of September 1974.

(SEAL)
Attest:

McCOY M. GIBSON JR.
Attesting Officer

C. MARSHALL DANN
Commissioner of Patents